Nov. 30, 1965 R. L. MALOBICKY ETAL 3,220,817
METHOD AND APPARATUS FOR SUPPORTING GLASS SHEETS
Filed June 7, 1962 4 Sheets-Sheet 1

INVENTORS
RUDOLPH L. MALOBICKY
HERBERT W. BARCH
BY JOSEPH D. KELLY and
CLEMENT E. VALCHAR Oscar L. Spencer
ATTORNEY

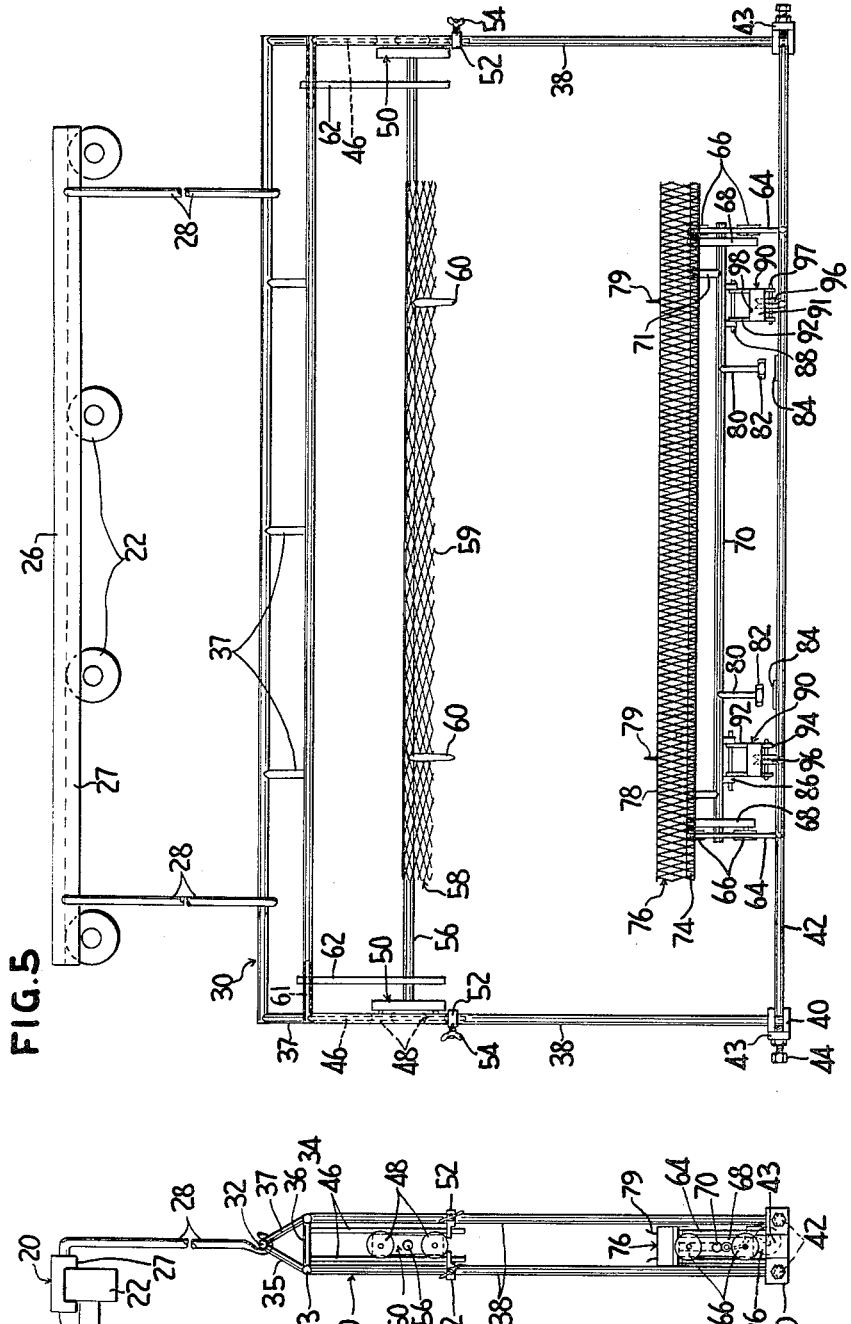

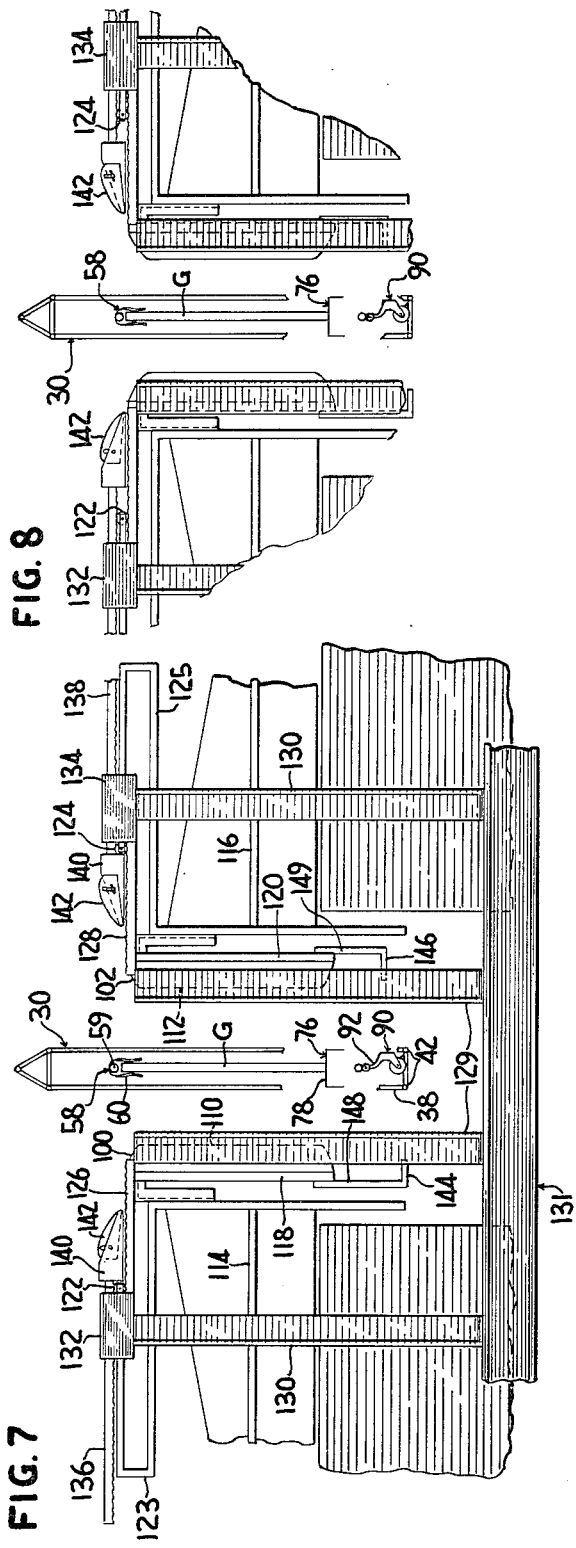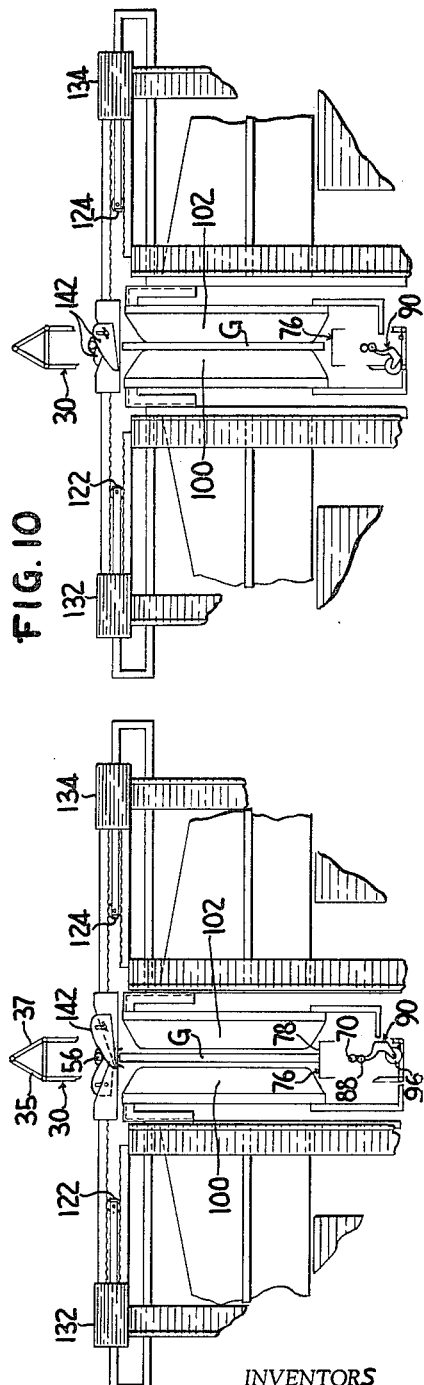

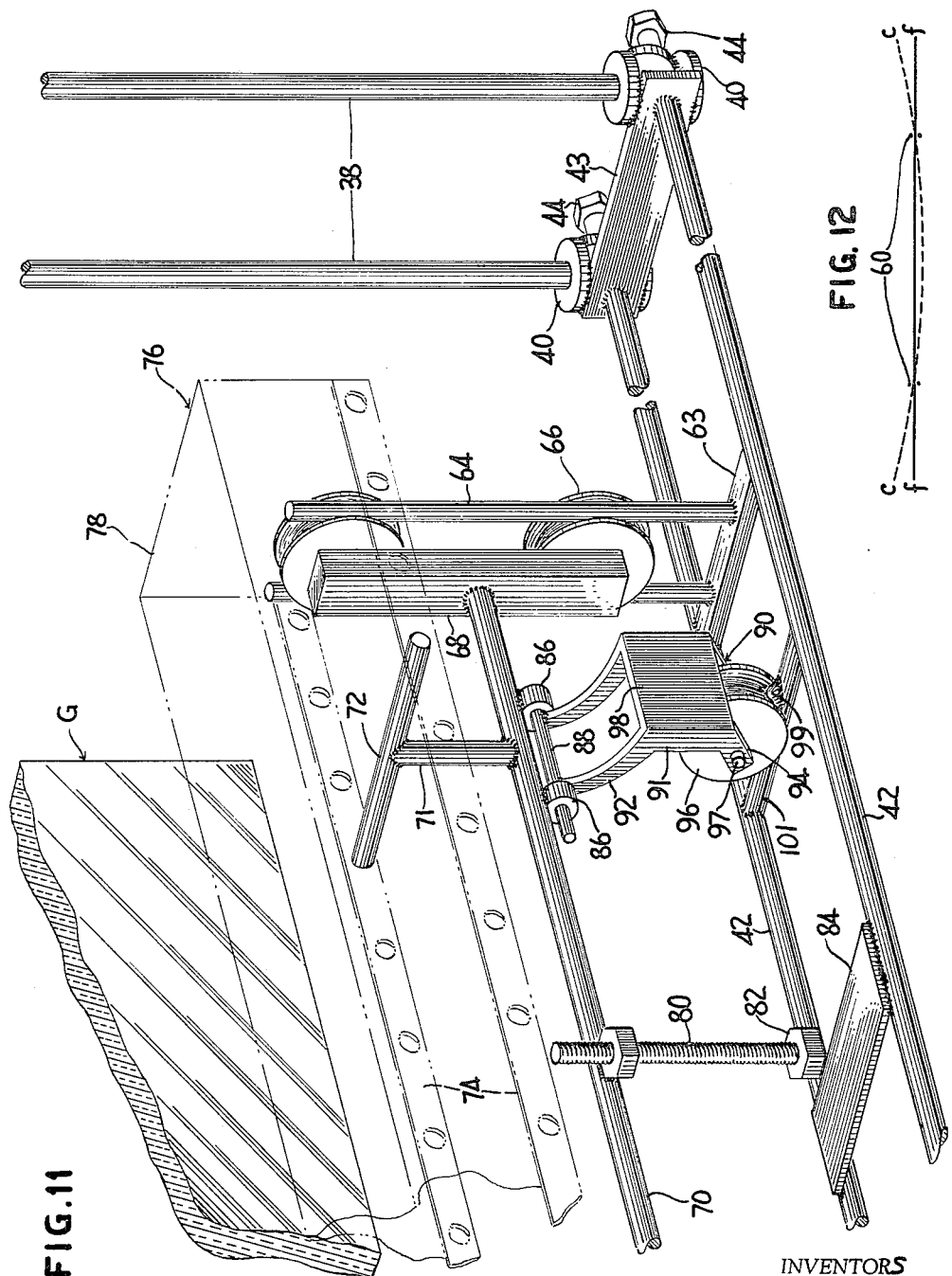

United States Patent Office 3,220,817
Patented Nov. 30, 1965

3,220,817
METHOD AND APPARATUS FOR SUPPORTING GLASS SHEETS
Rudolph L. Malobicky, Tarentum, Herbert W. Barch, Natrona Heights, Joseph D. Kelly, Cheswick, and Clement E. Valchar, Tarentum, Pa., assignors to Pittsburgh Plate Glass Company, Pittsburgh, Pa., a corporation of Pennsylvania
Filed June 7, 1962, Ser. No. 201,729
6 Claims. (Cl. 65—104)

This invention relates to method and apparatus for supporting glass sheets and relates to a method of balancing a glass sheet in a substantially vertical plane during a tempering operation, particularly one in which a glass sheet is first shaped between complementary shaped glass pressing members and subsequently tempered.

In the past, glass sheets have been bent between complementary pressing members by suspending the glass in a vertical plane by means of tongs which grip the glass between opposed tong points near the upper edge thereof. Optical defects resulting from the penetration of the tongs into the heat-softened glass and distortions resulting from the tendency of the tongs to pivot into a vertical plane in which they hang freely after the heat-softened glass sheet is shaped to have an inclined upper edge have caused the glass bending art to seek other ways of supporting the glass sheets while subjected to press bending.

The prior art has proposed to support the bottom edge of a glass sheet on a bottom edge support member and to balance the glass by means of hairpin-like members or wire clips which engage the glass sheet at its upper edge. U.S. Patent No. 2,263,005 to McClure shows this proposal.

The prior art also suggests supporting the bottom edge and top edge on spaced pivotable support elements which are capable of moving in response to the bending of the glass sheet to maintain their engagement with the edge of the glass as its vertical dimension is shortened during the bending operation. U.S. Patent No. 2,537,803 to Walters exemplifies this suggestion.

Neither of the prior art devices is completely acceptable, because they require the entire bottom edge or a portion of the edge to be maintained in continuous contact with a solid support member while the glass is being shaped to its ultimate configuration by pressurized contact between the opposing complementary pressing members. The portion of the glass sheet in continuous contact with a solid member throughout the shaping develops a different temperature from the uncontacted edge portions. The temperature difference produces an internal stress that induces weakness in the bent glass sheet.

When the entire length of the bottom edge of the glass sheet is supported throughout a bending operation, the rubbing action between the bottom edge of the glass and the support member distorts the bottom edge considerably. Such rubbing between the glass and the bottom edge support sometimes causes kinking of the bottom glass edge. This is especially true when the glass sheet undergoes bending about a vertical axis wherein different elements of the bottom edge are moved different distances relative to the support member in a horizontal direction.

If the glass is supported at spaced points of support, the localized support areas are caused to bear the entire mass of the heated glass sheet. The pressure is usually sufficient to cause kinking of the heat-softened glass in the localized areas of support.

It is an object of the present invention to support a flat glass sheet at its bottom edge while balancing the sheet in a substantially vertical plane, heating the sheet while so supported and balanced to substantially its deformation temperature, moving complementary shaping members toward one another into contact with the opposite major surfaces of the heated glass sheet, discontinuing bottom edge support for the glass sheet when the pressure of the shaping members against the opposite major surfaces of the glass is sufficient to support said glass sheet therebetween, holding the shaping members in pressurized contact against the glass sheet surfaces until the glass sheet assumes the shape of the complementary shaping members, withdrawing the shaping members from the shaped glass sheet, immediately cooling the glass sheet to below its deformation temperature, supporting the shaped glass sheet at its bottom edge, and balancing said shaped glass sheet in a substantially vertical plane.

The bottom edge support may be discontinued by lowering a bottom edge support member in synchronism with the movement of the complementary members toward one another according to a preferred ebodiment of the present invention. The complementary shaping members may be moved obliquely upward toward one another into contact with the opposite surfaces of the glass sheet to lift the bottom edge of the latter out of contact with its bottom edge support as an alternative method of producing the desired result. According to a third embodiment, the first two methods enumerated above may be combined.

It is desirable, though not absolutely necessary, that the perimeter of the glass sheet undergoing bending extend beyond the edges of the complementary pressing members. A maximum width of about one centimeter may be exposed completely around the perimeter of the glass sheet without harming the optical properties of the resulting article. In fact, optical properties superior to those obtained from glass sheets shaped between shaping members larger than the glass sheet are obtained with shaping members slightly smaller than the glass sheets undergoing shaping.

A particular apparatus for performing the method enumerated above comprises a supporting frame, upper and lower horizontal members supported for vertical movement within said frame, a plurality of relatively short balancing members and a pair of relatively long balancing members extending downward from the upper horizontal member along spaced vertical planes adjacent and flanking the vertical plane occupied by the flat glass sheet, means for supporting the upper member first in a lower position, second in a raised position, and third in an intermediate position and means for supporting the bottom horizontal member first in a raised position, and secondly in a lowered position. At least one of the complementary pressing members is provided with cams or equivalent means operatively connected thereto to control the movements of the upper and lower horizontal members in response to the program of movement of the complementary pressing members toward one another.

The movement of the upper and lower movable horizontal members is synchronized in such a manner that when the upper horizontal member is in its lowermost position to enable all the balancing members to encompass substantially the entire length of the glass sheet so as to balance the sheet in a substantially vertical plane, the lowermost horizontal member is in its raised position to support the bottom edge of a flat glass sheet. When the complementary glass shaping members move toward one another and begin to engage the glass in pressurized contact, the cams raise the upper horizontal member to its uppermost position wherein all the glass balancing members are raised out of engagement with the upper edge portion of the glass sheet so as not to interfere with the glass pressing operation.

In the preferred embodiment, other means are operatively connected to at least one of the pressing members to cause the bottom horizontal member to move downward a short distance. The glass is distorted in shape only by the pressing members and any deviation from the desired shape obtained in the prior art by virtue of the glass maintaining contact with the glass supporting and glass balancing elements during shaping is overcome by the fact that the present invention eliminates such contact during shaping.

When the complementary pressing members move away from one another, the bottom edge of the bent glass sheet is deposited on the lower horizontal member and the upper horizontal member is lowered into its intermediate position wherein only the two relatively long balancing members extend downward to encompass the upper edge of the bent glass sheet to balance the curved glass sheet. The relatively short balancing members do not extend downward a sufficient distance to encompass the upper edge when the upper and lower horizontal members are in their final position.

The relatively long balancing members are located in spaced vertical planes transverse to the portions of the flat vertical plane in which the flat glass sheet is supported initially. These transverse planes intersect the curved upper edge of the glass sheet after bending. Therefore, the portions of the bent glass sheet engaged by the relatively long balancing members are not displaced in a horizontal direction through the glass thickness when the glass sheets are bent about a vertical axis of bending only.

A typical illustrative embodiment of apparatus especially adaptable for use in the present invention will be described.

In the drawings, which form part of this description,

FIG. 1 is a longitudinal sectional view of illustrative bending and tempering apparatus with parts broken away to illustrate certain aspects of the present invention;

FIGS. 2, 3, and 4 are perspective views of a glass sheet supporting frame provided with upper and lower vertically movable horizontal members illustrating the positions occupied by the horizontal members during the heating phase preparatory to bending, during the bending operation, and during the quenching operation subsequent to bending, respectively;

FIG. 5 is a detailed elevation view of the glass supporting frame;

FIG. 6 is an end view of the frame shown in FIG. 5;

FIGS. 7 to 10 are fragmentary end views of the bending station showing the relative position of the pressing members and the actuating cams movable with the pressing members during various stages of the heating and bending operation, FIG. 7 showing the pressing members in their retracted position, FIG. 8 showing the pressing members moved part way toward one another, FIG. 9 showing the pressing members immediately prior to contact with the glass, and FIG. 10 showing the pressing members making contact with the glass and raising the upper horizontal member and lowering the bottom horizontal member in the process.

FIG. 11 is an enlarged fragmentary prespective view of a portion of the illustrative glass support frame showing the details of its construction.

FIG. 12 is a schematic line diagram illustrating the relation of certain apparatus elements to the glass sheet before and after bending.

Referring to the drawings,

FIG. 1 discloses a typical bending and tempering apparatus which utilizes the present invention. The illustrative apparatus incororates a glass loading station 10, a tunnel-like glass heating furnace 11 provided with typical entrance and exit doors 12 and individually controlled electrical heating elements 13, a glass pressing station 14, a quenching station 15 comprising opposed nozzle housings 16 movably mounted on cams 17 which provide orbital paths of movement for air blasts imparted through the nozzles of said nozzle housings from a pressurized source (not shown), and an unloading station 18 disposed in end-to-end relationship along a path of movement defined by a horizontal conveyor 20.

*Glass support and conveyance*

The conveyor 20 comprises a plurality of stub rolls 22 extending transversely of the conveyor path. The conveyor rolls are longitudinally spaced one from another. The conveyor rolls 22 are supported from a typical support structure 24 extending the length of the conveyor.

A motor and chain driving means (not shown) is used to rotate the conveyor rolls. When the conveyor rolls 22 rotate, they force a series of carriages or frame members 25 to move forwardly of the conveyor 20.

Each carriage 25 comprises an upper elongated rail member 26 adapted to rest on the conveyor rolls, an outer flange 27 attached to member 26 and extending downward in a vertical plane beyond the end of the stub rolls 22, rod members 28 extending downwardly from their attachment to flange 27 at their upper ends to suspend a frame member 30 therefrom by means of securing their bottom ends to a horizontal rod 32 extending lengthwise of the uppermost portion of the frame member 30.

Referring particularly to FIGURES 5 and 6, the frame member 30 comprises the upper horizontal rod 32, additional horizontal rods 33 and 34 mounted in a horizontal plane below that occupied by uppermost horizontal rod 32 and a series of brace rods 35, 36, and 37 forming a triangle between horizontal rods 32, 33, and 34 throughout the length of the latter. Oblique brace rods 35 interconnect horizontal rods 32 and 33, horizontal brace rods 36 interconnect horizontal rods 33 and 34, and oblique brace rods 37 interconnect horizontal rods 32 and 34.

The frame member 30 also includes a plurality of vertical posts 38 connected at their upper ends to each end of additional horizontal rods 33 and 34, respectively. The lowermost ends of vertical posts 38 are received in apertured housings 40 formed at each bottom corner of the frame 30. Elongated rods 42 interconnect housings 40. Transverse plates 43 interconnect the ends of rods 42. The longitudinally outer wall of each housing 40 is apertured to receive a set screw 44, the longitudinally inner end of which abuts the bottom of one of the vertical posts 38 to provide a rigid corner for the frame 30.

Vertical rails 46 are rigidly attached at their upper end in pairs to each horizontal brace rod 36. Rails 46 extend downward parallel to vertical posts 38 and inwardly thereof to receive therebetween a pair of grooved wheels 48 of a carriage 50.

A stop member 52 in the form of a double-apertured plate is mounted for slidable movement along each rail 46. This is accomplished by extending a rail 46 through one aperture of each plate and a vertical post 38 through the other aperture of the plate. A wing nut 54 locks each stop 52 to a vertical post 38. Stops 52 define the bottom position possible for carriages 50 along vertical rails 46. An upper vertically movable horizontal member 46 is connected between opposite carriages 50.

The upper horizontal member 56 supports an inverted channel member of expanded metal 58 whose apertured vertical walls 59 extend downwardly from the upper movable horizontal member 56 a distance sufficient to encompass the upper edge of a glass sheet when the upper horizontal member 56 occupies the lowest position defined by stops 52. The vertical walls 59 extend lengthwise in spaced vertical planes on opposite sides of the plane occupied by the flat glass sheet. The length of the vertical walls 59 is at least as long as the length of the longest glass sheet to be supported on the glass sheet support structure. Vertical walls 59 serve as relatively short balancing means that engage the upper edge portion of the glass sheet along substantially its entire length only when the upper horizontal member is in or adjacent its lowest permitted position.

In addition, two elongated clips or balancing members 60 are attached at their upper ends to the upper vertically movable horizontal member 56 and extend downward therefrom a distance greater than the vertical dimension of the vertical walls 59. The clips 60 serve as relatively long balancing means that engage the upper edge portion of the glass sheet when the upper movable horizontal member 56 is intermediate its uppermost and lowermost positions. Since the clips 60 are longer than the vertical walls 59, the former remain in balancing engagement with the top edge portion of the glass when the latter are either out of engagement or in balancing engagement with the upper portion of the glass sheet.

The carriages 50 are guided for vertical movement along rails 46 between the stops 52 and horizontal brace rods 36 which serve as stop means for the lowermost and uppermost positions of member 56. When the carriages 50 are in the uppermost position permitted when wheels 48 abut the horizontal brace rods 36 interconnecting the corresponding ends of horizontal rods 33 and 34, both the relatively short balancing members 59 and the relatively long balancing members 60 are completely above the upper edge of the glass sheet.

The relatively long balancing members or clips 60 extend downward in planes transverse to the plane of support for the flat glass sheet. The planes occupied by the clips intersect the lines of intersection between the curved upper edge of the glass sheet after bending and the initial plane of support for the flat glass sheet. FIG. 12 shows the relative position of the relatively long balancing members or clips 60 with the upper edge of the flat glass sheet f—f before bending and with the upper edge of the curved glass sheet c—c after shaping.

A stub shaft 61 (FIG. 2) extending longitudinally inwardly of each end horizontal brace rod 36 pivotally supports a hook 62 pivotally suspended therefrom. Each hook 62 is disposed to swing freely about a horizontal axis defined by each stub shaft and has a length sufficient to engage and support vertically movable horizontal member 56 adjacent its longitudinal extremities in a plane intermediate the uppermost and lowermost positions permitted along vertical tracks 46.

With special reference to FIG. 11, a pair of bars 63 interconnect bottom elongated rods 42 of frame member 30. Each bar 63 supports a pair of vertical rails 64 which extend upward therefrom. Each pair of vertical rails is engaged by grooved rollers 66 which form part of carriages 68. Carriages 68 are interconnected by a lower vertically movable horizontal member or bar 70.

A series of vertical bars 71 extend upward from the lower horizontal bar 70 and support horizontal bars 72 centrally thereof. The latter rigidly interconnect reinforcement bars 74 extending along the bottom of the vertical walls of an inverted channel shaped member 76 of expanded metal whose upper surface 78 serves as a bottom glass sheet edge support means. Guide wires 79 aligned in vertical axes with relatively long balancing members 60 extend upward a short distance from the bottom glass edge support surface 78 to limit lateral displacement of the bottom edge.

In addition, downwardly extending rods 80 provided with an enlarged abutment means 82 at the bottom thereof are attached at their upper ends to the lower vertically movable horizontal member 70. A support plate 84 interconnects bottom rods 42 directly below each abutment means 82.

The lower horizontal member 70 also supports a pair of sets of ears 86, through each pair of which a pivot rod 88 extends. An open box-like member 90, having a pair of side walls 91 provided with parallel, curved arms 92 extending from one end and short extensions 94 extending from the other end thereof, is attached to pivot rod 88 through the curved arms 92. A wheel 96 is pivotally mounted on a rod 97 interconnecting extensions 94. The box-like member 90 has a flat wall 98 interconnecting the side walls provided with said curved arms 92 and triangular extensions 94. The entire box-like member 90 is skewed to one side of the vertical plane of support for the first glass sheet passing through the upper horizontal member 56 for reasons to be explained later.

When a glass sheet rests on the upper surface 78 of the expanded metal bottom edge glass support member 76, the mass of the glass and the glass supporting structure, including lower horizontal member 70, carriages 68, the bottom edge glass support member 76 and the interconnecting members, applies a downward vertical force onto the wheel 96 that holds the bottom glass edge support assembly in rigid position against an abutment 99 on a cross rail 101 (FIG. 11) in the absence of the application of a horizontal force on the pivotable box-like member 90. In this position, abutment means 82 is spaced from support plate 84 by a distance desired for the spacing between the bottom edge support means 78 and the glass sheet bottom edge when the opposite glass surfaces are engaged by the complementary shaped pressing members.

Glass pressing apparatus

The details of the pressing apparatus which cooperate with the elements of the glass sheet support apparatus previously described will be described with reference to FIGS. 7 to 10. The pressing apparatus comprises complementary pressing members 100 and 102, provided with convex and concave shaping surfaces 110 and 112, respectively. The shaping surfaces are covered with a material that does not mar the surfaces of a glass sheet such as knit fiber glass cloth.

The complementary pressing members 100 and 102 are attached to the inner end of movable pistons 114 and 116. Each piston 114 and 116 is rigidly attached to the rear of a plate 118 and 120, respectively. Plate 118 is secured to the rear of complementary pressing member 100 whereas plate 120 is secured to the rear of pressing member 102.

A pinion gear 122 is attached to movable piston 114 for movement therewith through connecting superstructure 123 and an additional pinion gear 124 is attached to movable piston 116 for movement therewith through connecting superstructure 125. Pinion gears 122 and 124 are movable along racks 126 and 128, respectively, rigidly attached to posts 129 and 130 of the support structure 131 within which the movable pistons 114 and 116 are movably supported. Tunnel-like housings 132 and 134 are rigidly supported on posts 130 to engage the upper smooth surfaces of the movable racks 136 and 138. The bottom teeth of the movable racks 136 and 138 are engaged by pinion gears 122 and 124 to cause the movable racks 136 and 138 to be displaced with respect to the fixed racks 126 and 128 at twice the speed of movement of the glass pressing or shaping members 100 and 102.

Attached to the longitudinally inner end of each movable rack 136 and 138 is a cam support housing 140 to which is attached a cam 142. Plates 120 and 122 each support a pair of fingers 144 and 146, respectively, extending horizontally inward from a vertical attachment member 148 or 149, respectively.

Operation of the device

Flat glass sheets are loaded onto the support structure at the loading station 10 after the box-like members 90 are pivoted into a position wherein wheel 96 is vertically aligned below lower horizontal member 70 thereby locating the bottom edge glass sheet support surface 78 in its upward position for supporting the bottom edge of a glass sheet. The upper vertically movable horizontal member 56 is raised a distance sufficient to permit the loading of a glass sheet with its bottom edge resting on the bottom glass edge support means 78. The hooks 62 are pivoted out of the way so that the carriages 50 move into their bottom position provided by the stops 52. In this position, relatively short vertical walls 59 of expanded metal extend downwardly from the upper vertically movable horizontal member 56 a distance sufficient to overlap the upper edge of the glass sheet to balance the latter.

The frame is then conveyed into the furnace 12 where the glass sheet is heated to a temperature sufficient for it to be press bent. The employment of expanded metal members causes minimum interference with the usual heating of the upper and lower glass edges. A typical heating operation for commercial soda-lime-silica plate glass of nominal thickness of ¼ inch involves exposing the glass sheets for about 4 minutes to a furnace temperature of about 1250 degrees Fahrenheit, thereby raising the glass surface temperature to about 1225 degrees Fahrenheit and the body of the glass sheet to substantially its deformation temperature throughout its thickness.

When the glass sheet attains its proper temperature, the exit door 12 opens and the heated sheet is conveyed from the tunnel-like glass heating furnace 11 into the glass pressing station 14 where the complementary glass pressing members 100 and 102 are moved toward one another in order to impress the shape of their shaping surfaces 110 and 112 onto the glass sheet. The cams 142 and fingers 144 and 146 are so constructed that when the pressing members 100 and 102 begin to make pressurized contact with the glass, and before the glass is distorted, fingers 144 or 146 engage the flat wall 98 to swing the box-like member 90 toward the opposite finger, depending on which side of the vertical support plane the box-like member 90 is skewed, thereby permitting the lower horizontal member 70 and its attached lower glass edge supporting surface to move downward a small distance. At the same time, cams 142 move inward to engage and begin to lift the upper vertically movable horizontal member 56 upwardly.

The bottom edge support structure moves downward by gravity until abutment means 82 contacts support plate 84 thus spacing the bottom edge support member out of contact with the glass and lowering the bottom wires 79 out of engagement with the glass. The upper vertically movable horizontal member 56 moves upward a sufficient distance to enable the relatively short balancing member 59 and the relatively long balancing members 60 to be raised completely clear of the upper edge of the glass sheet as shown in FIGS. 3 and 10.

Hooks 62 are now free to pivot into their free hanging position. In this position, they receive horizontal member 56 in an intermediate position wherein only the relatively long balancing members 60 engage the top edge of the glass sheet when member 56 is released from the cams.

In a typical bending operation, it takes about 4 seconds to move the glass sheet from the furnace 11 to the pressing station 14. About 2 more seconds are required to move the glass shaping members into pressurized contact with the heat-softened glass sheet. The shaping members are held in pressurized contact against the opposite surfaces of the glass sheet for about 2 seconds at a pressure of about 1 pound per square inch.

When the complementary pressing members 100 and 102 move away from one another after having impressed their shape onto the heat-softened glass sheet, the bottom edge of the glass sheet lowers onto the bottom edge support surface 78 and the upper vertically movable horizontally disposed member 56 moves downward until it is supported by the hooks 62 as shown in FIGURE 4. In this position, only the relatively long hairpin balancing members 60 are in position to engage the upper edge portion of the glass to balance the latter and prevent the glass from tilting.

The complementary pressing members 100 and 102 have curved shaping surfaces defining a curvature about a vertical axis. The relatively long hairpin balancing members 60 are located along the length of the upper horizontal member 56 where the vertical plane of support for the flat glass sheet intersects the curved glass surface. Thus, the glass sheet portion intermediate the hairpin balancing members 60 is displaced in one direction and the glass sheet end portions outwardly of the hairpin balancing members 60 are displaced in the opposite direction but the glass sheet portions engaged by the hairpin balancing members remain in the same vertical plane as they occupied before the bending operation commenced.

The area of the glass shaping members contacting the glass sheets is smaller than the outline of the glass sheet to be bent so as to expose the margin of the glass during the pressing operation. This helps avoid contact between the glass shaping members and the glass supporting and glass balancing members when the glass is shaped. It also improves the optical properties of the bent glass sheet. This aspect of the present apparatus is not part of the present invention, but is incorporated in an invention of Harold E. McKelvey, described and claimed in another patent application.

Pivoting the box-like members 90 permits either finger 144 or 146 to actuate the lowering of the bottom edge support structure regardless of the orientation of the glass supporting frame 30. It also permits the fingers to remain clear of one another even when the press members are in mating relation on opposite sides of the glass sheet undergoing bending.

The glass sheets bent about a vertical axis of curvature are then conveyed into the quenching station 16 where opposing air blasts are imparted onto the opposite surfaces of the glass sheet. The carriages 30 are then removed to the unloading station 18 where the glass sheets are removed and the carriages are returned to the loading station for a subsequent operation.

The form of the invention shown and described herein represents an illustrative preferred embodiment thereof. It is understood that various changes may be made without departing from the spirit of the invention as defined in the claimed subject matter which follows.

What is claimed is:

1. A method of supporting flat glass sheets having upper and lower edges and opposing major flat surfaces during bending comprising supporting a flat glass sheet at its bottom edge while loosely engaging said sheet along its upper edge portion to balance said sheet in a substantially vertical plane, heating said sheet while so supported and balanced to substantially its deformation temperature, moving complementary shaping members toward one another into contact with the opposite flat major surfaces of said heated glass sheet until said sheet is in supporting engagement with said shaping members; and, while said sheet is so supported, moving said bottom edge support from the lower edge of said glass sheet until said support is a short distance therebelow, and moving said upper edge balance upwardly out of engagement with the upper edge of said sheet, maintaining the shaping members in pressurized contact against the heat-softened glass sheet surfaces as the glass sheet assumes the shape of the complementary shaping members, withdrawing the shaping members from the shaped glass sheet to redeposit the lower edge thereof on said bottom edge support, and, at substantially the same time, lowering said edge balance to reengage loosely the upper edge of the shaped sheet and immediately cooling the shaped glass sheet while so supported to below its deformation temperature.

2. Apparatus for supporting glass sheets during bending comprising a frame, upper and lower horizontal members supported for vertical movement within said frame, stop means operatively connected to said upper horizontal member defining an upper position and a lower position for said upper horizontal member, means attached to said lower horizontal member for supporting the lower edge of a glass sheet, means attached to said upper horizontal member and extending downward therefrom for loosely engaging the upper edge portion of a glass sheet to balance the latter in a substantially vertical position, a pair of pressing members having complementary shaping surfaces and movable toward one another to engage a heat-softened glass sheet in pressurized contact therebetween, thereby conforming the shape of the glass sheet to that of said shaping surfaces, and means attached to at least one of said pressing members and movable therewith to raise the upper horizontal member, thereby to disengage the balancing means from said upper edge portion and to lower the lower horizontal member to remove the means for supporting the lower edge of the glass sheet out of contact with said lower edge in response to the pressing members contacting the opposite surfaces of said glass sheet in pressurized engagement therewith.

3. Apparatus as in claim 2, further including a conveyor defining a path of movement in a vertical plane, said plane extending through a tunnel-like furnace and between said pair of pressing members when the latter are retracted, means attached to said frame for supporting said frame for movement along said conveyor, and means within said furnace for heating glass sheets supported within said frame to the glass softening point while said frame traverses said furnace.

4. Apparatus as in claim 2, further including means carried by said frame and responsive to separation of said pressing members from one another to support said upper horizontal member in a position intermediate said upper position and said lower position when the pressing members become disengaged from the opposite surfaces of a shaped glass sheet.

5. Apparatus as in claim 4, further including a plurality of relatively short balancing members extending downward from said upper horizontal member a distance sufficient to engage the upper edge portion of the flat glass sheet when the upper horizontal member occupies its lowermost position, but insufficiently long to engage the upper edge portion of the glass sheet when said upper horizontal member occupies said intermediate position, and a pair of spaced, relatively long balancing members extending downward a distance sufficient to engage the upper edge portion of the flat glass sheet when the upper horizontal member occupies said lowermost position and said intermediate position, but insufficiently long to engage the upper edge portion of the glass sheet when said upper horizontal member occupies said uppermost position.

6. Apparatus as in claim 5, wherein said relatively long balancing members are disposed in transverse vertical planes intersecting both the curved upper edge of the glass sheet after bending and the vertical plane of support for the flat glass sheet.

References Cited by the Examiner

UNITED STATES PATENTS

| 2,247,289 | 6/1941 | Despret | 65—114 |
| 2,263,005 | 11/1941 | McClure | 65—287 X |
| 2,729,032 | 1/1956 | White | 65—289 |
| 3,062,520 | 11/1962 | Frey et al. | 65—182 X |
| 3,086,375 | 4/1963 | Mainz | 65—58 |

FOREIGN PATENTS 1,210,865   10/1959   France.

DONALL H. SYLVESTER, *Primary Examiner.*